United States Patent Office 3,057,890
Patented Oct. 9, 1962

3,057,890
CERTAIN POLYOXYALKYLENE GLYCOL ESTERS
Melvin De Groote, St. Louis, Mo., assignor to Petrolite Corporation, Wilmington, Del., a corporation of Delaware
No Drawing. Original application Apr. 17, 1958, Ser. No. 729,052. Divided and this application June 30, 1959, Ser. No. 823,807
1 Claim. (Cl. 260—407)

This application is a division of my co-pending application Serial No. 729,052, filed April 17, 1958, and a continuation-in-part of my co-pending application Serial No. 677,982, filed August 13, 1957. This latter application is in turn a continuation-in-part of my now abandoned applications Serial No. 425,944, filed April 27, 1954, and Serial Nos. 520,011; 520,012 and 520,013, all filed July 5, 1955.

The present invention relates to monomeric and polymeric solvent-soluble esters of polycarboxy acids with a polyoxyalkylene glycol mixture of the general statistical formula $$HO—(R)_y—(C_2H_4O)_x—(R')_{y'}—H$$

wherein $x$ is at least five and not over 60, R and R' represent at least one radical selected from the group consisting of $C_3H_6O$ and $C_4H_8O$, and $y$ plus $y'$ is not less than 5 and not greater than 200.

The above described polyoxyalkylene glycol mixture is the subject matter of my copending application Serial No. 677,982, filed August 13, 1957, and is obtained by the oxypropylation or oxybutylation or both of a polyoxyethylene glycol, which glycol is the addition product of one mole of water and at least 5 and not over 60 moles of ethylene oxide. Where both propylene and butylene oxides are the oxyalkylating agents, they may be added stepwise or as a mixture.

The present invention is primarily concerned with the preparation of new, novel, and useful cogeneric mixtures where the final properties of the materials are controlled, at least in part, and in any event significantly, by the introduction of a hydrophilic segment internally into the otherwise hydrophobic polyalkylene glycol. Rather than being ineffective in the determination of final properties, it has been found that the internal hydrophilic segments can be used to control the final properties of the cogeneric mixtures so that new, novel, and eminently useful materials are produced. It is one purpose of this invention to set forth means whereby a class of new and novel cogeneric mixtures may be obtained with specifically controlled and predetermined properties so as to make them of greatly enhanced usefulness for a wide range of purposes.

The products of this invention have been defined above by means of a statistical formula and are often referred to as cogeneric mixtures. This is for the reason that if one selects any hydroxylated compound and subjects it to oxyalkylation particularly where the amount of oxide added is comparatively large, for example, 30 units of ethylene oxide, it is well known that one does not obtain a single constituent such as $RO(C_2H_4O)_{30}H$. Instead, one obtains a cogeneric mixture of closely related homologous compounds in which the formula may be shown as the following: $RO(C_2H_4O)_xH$, wherein $x$, as far as the statistical average goes, is 30, but the individual members present in significant amount may vary from compounds where $x$ has a value of 25 and perhaps less, to a point where $x$ may represent 35 or more. Such mixture is, as stated, a cogeneric closely related series of touching homologous compounds. Considerable investigation has been made in regard to the distribution curves for linear polymers. Attention is directed to the article entitled "Fundamental Principles of Condensation Polymerization," by Paul J. Flory, which appeared in Chemical Reviews, volume 39, No. 1, page 137.

What has been said in regard to a monohydric compound is of course multiplied many times in the case of a glycol. Accordingly, in the above first mentioned statistical formula, $y$ and $y'$ cannot be individually defined but their sum, as far as the statistical average goes, corresponds to the number of hydrophobic units introduced, i.e., the number of units of propylene and/or butylene oxide.

For purpose of convenience, what is said hereinafter will be divided into six parts.

Part 1 is concerned with polyethylene glycols suitable for use as initial reactants.

Part 2 has three divisions wherein the oxyalkylation with propylene oxide, butylene oxide, mixtures of propylene and butylene oxides, and stepwise addition of propylene and butylene oxides is described.

Part 3 is concerned with a description of suitable polycarboxy acids and particularly dicarboxy acids employed as reactants.

Part 4 is concerned with the reaction involving the glycols and the polycarboxy acids and particularly the dicarboxy acids.

Part 5 is concerned with the use of the final products in the resolution of petroleum emulsions of the water-in-oil type.

Part 6 is concerned with some of the other more important industrial applications wherein the final products can be most advantageously utilized.

PART 1

As stated above, the glycol mixture which is esterified is obtained by the oxypropylation or oxybuylation, or both, of a polyoxyethylene glycol, which glycol is the addition product of one mole of water and at least 5, and not over 60 moles of ethylene oxide. For all practical purposes, the parent glycols represent not only pentaethylene glycol, hexaethylene glycol, and heptaethylene glycol, but also the higher range of polyethylene glycols up to the point where approximately 60 moles of ethylene oxide have been combined with one mole of water. In other words, the range up to approximately 2660 molecular weight (theoretical).

Pentaethylene glycol can be obtained in technically pure form, but this represents a more expensive reactant if separated from its cogeners. Actually the form of this product most readily available on a commercial scale is polyethylene glycol 250 which represents principally a mixture of glycols, to produce a mole of which a mole of water and 5 moles or 6 moles of ethylene oxide have been combined: i.e., it is a mixture of pentaethylene glycol and hexaethylene glycol.

Another polyethylene glycol commercially available represents a mixture having approximately 6 or 7 ethylene oxide units in the molecule. This material is sold commerically as polyethylene glycol 300. The average molecular weight of polyethylene glycol 300 runs from 285 to 315. Some manufacturers furnish, if specified, a product referred to as "polyethylene glycol 300 minus." In this instance the molecular weight is about one-eighth less than the usual average indicated above. Any such glycols can be readily prepared if desired.

There are available commercially a variety of polyethylene glycols whose molecular weights come within the range herein specified. The lower members of the series are liquids and the higher molecular weight members are waxy solids. In general these materials are soluble in water—being less soluble in hot water than in cold water. These include products such as polyethylene glycol 400, polyethylene glycol 600, polyethylene glycol 1000, polyethylene glycol 1500, etc.

The preferred initial starting materials for the manufacture of the herein disclosed products are the lower molecular range polyethylene glycols or cogeneric mixtures of the same. This applies not only to the range of 300 and 400, but also up to the range in which approximately 14 up to 20, 22, or 23 moles of ethylene oxide have been added to one mole of water. In other words, the range up to the molecular weight just short of 1000. If a polyethylene glycol of the appropriate chain length is not available, one may select an available polyethylene glycol of lower chain length and treat it with ethylene oxide in the presence of an alkaline or other suitable catalyst to produce a material of the desired molecular weight. The processes for the production of polyethylene glycols by the addition of ethylene oxide to water or a glycol are well known to the art.

Actually, as is well known, when one prepares even lower molecular weight glycols, for instance, pentaethylene glycol, hexaethyleneglycol, heptaethyleneglycol, decaethyleneglycol, etc., one obtains a cogeneric mixture from which it is difficult or impossible or expensive to separate the single glycol. Indeed, this is true of even the simplest oxyalkylation as, for example, the oxyalkylation of a monohydric alcohol. Reference is made to U.S. Patent No. 2,679,513, dated May 25, 1954, to De Groote, with particular reference to columns 19 and 20 thereof.

It is understood, of course, that polyethylene glycols may be synthesized by other means than the reaction of ethylene oxide. For special purposes where particularly pure materials are desired or where exact molecular configurations are wanted, any of a number of well known etherification reactions may be employed. However, for most commercial processes where economy is of chief importance treatment with ethylene oxide is employed. For the purposes of this invention any polyethylene glycol of the general formula:

$$HO-(C_2H_4O)_xH$$

where $x$ is at least 5 and not over 60 may be employed.

PART 2

Subdivision A

OXYALKYLATION WITH PROPYLENE OXIDE

As is well known the oxypropylation derivatives of any oxyalkylation-susceptible compound are prepared by the addition reaction between propylene oxide and such a compound. The addition reaction is advantageously carried out at an elevated temperature and pressure and in the presence of a small amount of alkaline catalyst. Usually, the catalyst is sodium hydroxide or sodium methylate. Metallic sodium, with the prior elimination of hydrogen (formation of an alkoxide), can be used. The reaction temperature is apt to be 150° C., or somewhat less, and the reaction pressure is not in excess of 30 to 60 pounds per square inch. The reaction proceeds rapidly. Actually, there is little difference between the use of propylene oxide and straight chain butylene oxide. See, for example, U.S. Patent No. 2,636,038, dated April 21, 1953, to Brandner, although another hydroxylated compound is there employed. Instead of using propylene oxide, one can, of course, use propylene carbonate.

As to further information in regard to the mechanical steps involved in oxyalkylation, see U.S. Patent No. 2,499,365, dated March 7, 1950, to De Groote et al. Particular reference is made to columns 92 at seq. thereof.

The oxypropylation of a liquid or a product which is liquid at ordinary temperature and particularly at oxyalkylation temperature is comparatively simple and this is true also where both hydroxyls are primary hydroxyls, as in the case of the ethylene glycols. Thus one can do either one of two things: mix the polyglycol with a suitable solvent such as xylene or a high boiling aromatic solvent so as to produce a solution or suspension, or else simply melt the product so that it is liquid prior to introduction of the oxide. My preference is simply to mix the product with a suitable amount of a selected catalyst, such as powdered caustic soda or powdered sodium methylate. The amount of catalyst may vary from 1% to 5%. The reaction vessel is flushed out, the temperature raised to an appropriate point, and oxypropylation proceeds in the customary manner. In any event, whether one adds a solvent or merely melts the product, it is immaterial because at a very early stage the material becomes a liquid and becomes homogeneous by solution or dispersion.

As has been pointed out previously, the initial products herein employed are combinations of water with from five or more moles of ethylene oxide. As is well known, polyethylene glycols are very water soluble. For instance, even when a molecular weight of 6,000 is reached, one part of glycol will dissolve in approximately two parts of water.

The following examples illustrate the oxypropylation of polyethylene glycols.

Example 1a

The reaction vessel employed was a stainless steel autoclave with the usual devices for heating, heat control, stirrer, inlet, outlet, etc., which are conventional in this type of apparatus. The capacity was approximately 11 gallons. The stirrer operated at a speed of approximately 250 r.p.m.

There were charged into the autoclave 2380 grams of a technical grade of pentaethylene glycol. This corresponded roughly to a product commercially obtainable as polyethylene glycol 250 minus. There were added also 38.5 grams of sodium methylate. The autoclave was sealed and swept with nitrogen gas, and heat was applied with stirring, so as to get appropriate suspension or solution of catalyst. The temperature was allowed to rise to 136° C. At this point addition of propylene oxide was started. It was added continuously until approximately 21.3 kilograms were added. The propylene oxide was added at a comparatively slow rate and the total time required was 4¼ hours. This operation could have been speeded but it was preferred to use a slow addition rate. During this period the temperature was maintained at 136° C. to 152° C., using cooling water through the inner coils when necessary and otherwise applying heat if required. The maximum pressure during the reaction was 55 pounds per square inch. This represented the addition of approximately 38 moles of propylene oxide per mole of pentaethylene glycol. The product was substantially water insoluble. In the cogeneric mixture there might have been a comparatively small amount of somewhat water-soluble material. Even such small amount of water-soluble material, which might have been a few percent or less, was eliminated by following the procedure outlined in the next two examples.

Example 2a

The same procedure was followed as in Example 1a except that instead of adding 21.3 kilograms of propylene oxide there were added 20% more, to wit, a total of 25.5 kilograms. The amount of catalyst used was increased to 50 grams. The reaction time was 6.5 hours. Otherwise, the operating conditions were approximately the same as in Example 1a. The final product seemed to be completely free from even small amounts of water-soluble materials.

Example 3a

The same procedure was followed as in Examples 1a and 2a, preceding, except that the amount of catalyst was increased to 75 grams and the amount of propylene oxide was increased to 29.7 kilograms. The time period was 8 hours.

In both the preceding example and in the present example a somewhat larger autoclave was used than in Example 1a. The product so obtained seemed to be free from any water-soluble materials.

In a number of instances a commercially obtainable product, polyethylene glycol 250, has been subjected to the same procedures as described in Examples 1a, 2a and 3a. Added examples of this kind are described as Nos. 4a through 6a, wherein polyethylene glycol 250 was used as the starting material. Its approximate molecular weight of 250 corresponds approximately to 5.27 moles of ethylene oxide. Stated another way, approximately 232 of the 250 molecular weight units represent ethylene oxide residues. (The remainder is 1 mole of water, of course.)

TABLE I

| Ex. No. | Mol. weight initial glycol used | Weight of propylene oxide added/ mole | Moles of propylene oxide added/ mole | Distribution of alkylene oxide residues in product, percent | |
|---|---|---|---|---|---|
| | | | | Ethylene oxide | Propylene oxide |
| 4a | 250 | 2,030 | 35 | 10.9 | 89.1 |
| 5a | 250 | 2,436 | 42 | 9.3 | 90.7 |
| 6a | 250 | 2,842 | 49 | 8.1 | 91.9 |

In the above examples the amounts used were grams. The same procedure was repeated, however, using ten times the weights in each instance, i.e., starting with 2,000 grams and adding in excess of 20 kilograms of propylene oxide in a duplication of Example 4a.

Further examples of oxypropylated polyethylene glycols appear as points on the graph of FIGURE 1 of my co-pending application Serial No. 677,982, filed August 13, 1957. A representative number of these glycols are presented in tabular form below.

TABLE III

| Ex. No. | Ethylene oxide in initial glycol, moles | Propylene oxide added, moles | Molecular weight of product excluding mole of $H_2O$ |
|---|---|---|---|
| 15a | 6 | 6 | 612 |
| 16a | 6 | 20 | 1,424 |
| 17a | 6 | 35 | 2,294 |
| 18a | 6 | 55 | 3,454 |
| 19a | 15 | 6 | 1,008 |
| 20a | 15 | 25 | 2,050 |
| 21a | 15 | 45 | 3,270 |
| 22a | 25 | 10 | 1,680 |
| 23a | 25 | 30 | 2,840 |
| 24a | 25 | 60 | 4,580 |
| 25a | 33 | 15 | 2,322 |
| 26a | 41 | 6 | 2,152 |
| 27a | 41 | 35 | 3,834 |
| 28a | 50 | 15 | 3,070 |
| 29a | 50 | 55 | 5,390 |

In the above examples the amounts used were gram-moles.

In the following Table II, the weights are shown in pounds. The amount of catalyst and oxyalkylation temperatures, time periods and other conditions were about the same as previously described. In the examples of Table II, the starting material was one pound mole of ethylene glycol and to this was added successively ethylene oxide and propylene oxide in the amounts shown.

TABLE II

| Ex. No. | Ethylene glycol/lbs. | Ethylene oxide/lbs. | Propylene oxide/lbs. | Molecular weight of product |
|---|---|---|---|---|
| 7a | 62 | 396 | 480 | 938 |
| 8a | 62 | 836 | 960 | 1,858 |
| 9a | 62 | 1,276 | 1,440 | 1,778 |
| 10a | 62 | 1,716 | 1,920 | 3,898 |
| 11a | 62 | 481 | 425 | 968 |
| 12a | 62 | 1,006 | 850 | 1,918 |
| 13a | 62 | 1,531 | 1,275 | 2,868 |
| 14a | 62 | 2,056 | 1,700 | 3,818 |

PART 2

Subdivision B

OXYALKYLATION WITH BUTYLENE OXIDE

The oxybutylation of a liquid or a product which is liquid at ordinary temperature and particularly at oxyalkylation temperatures is comparatively simple and is similar to oxypropylation as described above.

At the present time there is available butylene oxide which includes isomeric mixtures; for instance, one manufacturer has previously supplied a mixed butylene oxide which is in essence a mixture of 1-butene oxide, 2-butene oxide isomers and approximately 10% isobutylene oxide. Another manufacturer has supplied an oxide which is roughly a fifty-fifty mixture of the cis- and trans-isomers of 2-butene oxide.

There is also available a butylene oxide which is characterized as straight chain isomers being a mixture of the 1,2- and the 2,3-isomers and substantially free from the isobutylene oxide.

This latter product appears to consist of 80% of the 1,2 isomer and 15% of the mixed 2,3-cis- and 2,3-trans-isomer. I have obtained the best results by using an oxide that is roughly 80% or more of the 1,2-isomer and with either none, or just a few percent if any, of the isobutylene oxide, the difference being either form of the 2,3 or a mixture of the two forms.

My preference is to use an oxide substantially free from the isobutylene oxide, or at least having minimum amounts of isobutylene oxide present.

Since the varying solubility of different butanols is well known, it is unnecessary to comment on the effect that the varying structure has on solubility of derivatives obtained by butylene oxide. Purely by way of example, the solubility of the first two available butylene oxides has been tested and it has been noted that in one instance the butylene oxide would dissolve to the extent of 23 grams in 100 grams of water, whereas the other butylene oxide would only dissolve to the extent of 6 grams in 100 grams of water. These tests were made at 25° C.

As to further reference in regard to the isomeric butylene oxides, see "Chemistry of Carbon Compounds," volume I, part A, "Aliphatic Compounds," edited by E. H. Rodd, Elsevier Publishing Company, New York, 1951, page 671.

As to the difference in certain proportions of the cis- and trans-form of straight chain isomers of 2,3-epoxybutane see page 341 of "A Manual of Organic Chemistry," volume I, G. Malcolm Dyson, Longmans, Green and Company, New York, 1950.

Reference to butylene oxide herein of course is to the compound or compounds having the oxirane ring and thus excludes 1,4-butylene oxide (tetrahydrofurane) or a trimethylene ring compound.

When reference is made to butylene oxide, one can use the corresponding carbonates. Butylene carbonate, or the carbonate corresponding to a particular oxide, is not available commercially but can be prepared by the usual methods in the laboratory. For this reason further reference to the alkylene carbonates will be ignored although it is understood when oxypropylation takes place by means of propylene carbonate one could, of course, use butylene carbonate for oxybutylation.

In the present invention I have found that outstanding products are obtained by the use of certain preferred butylene oxides, i.e., those entirely free or substantially free from isobutylene oxide (usually 1% or less) and composed of approximately 85% or more of the 1,2-isomer with the remainder, if any, being the 2,3-isomer.

I have studiously avoided the presence of the isobutylene oxide as far as practical. When any significant amount of isobutylene oxide happens to be present, the results are not as satisfactory regardless of the point when the butylene oxide is introduced. One explanation may be the following. The initial oxybutylation which may be simplified by reference to a monohydric alcohol, produces a tertiary alcohol. Thus the oxybutylation in the presence of an alkaline catalyst may be shown thus:

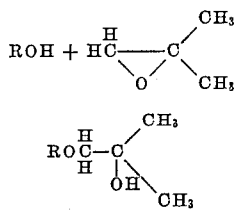

Further oxyalkylation becomes difficult when a tertiary alcohol is involved although the literature records successful oxyalkylation of tertiary alcohols. This does not necessarily apply when oxyalkylation takes place in the presence of an acidic catalyst, for instance, a metallic chloride such as ferric chloride, stannic chloride, aluminum chloride, etc.

The presence of isobutylene oxide depending on the catalyst may be the source of difficulty in that a tertiary alcohol radical may be formed even though conditions can be selected without difficulty to avoid such possibility, or at least limit the formation of a terminal tertiary alcohol group to a small proportion of the cogeneric mixture. It seems, however, this is only a partial explanation of what takes place in certain exhaustive oxybutylation procedures.

Another explanation may rest with the fact that isobutylene oxide may show a tendency to revert back to isobutylene and oxygen and this oxygen may tend to oxidize the terminal hydroxyl radicals. This possibility is purely a matter of speculation, but may account for the reason we obtain much better results using a butylene oxide as specified. In regard to this reaction, i.e., possible conversion of an alkylene oxide back to the olefine and nascent oxygen, see "Tall Oil Studies II, Decolorization of Polyethenoxy Tallates, With Ozone and Hydrogen Peroxide," U. V. Karabinos et al., J. Am. Oil Chem. Soc. 31, 71 (1954).

The following examples illustrate the oxybutylation of polyethylene glycols.

*Example 1aa*

The reaction vessel employed was a stainless steel autoclave with the usual devices for heating, heat control, stirrer, inlet, outlet, etc., which are conventional in this type of apparatus. The capacity was approximately 6.5 gallons. The stirrer operated at a speed of approximately 250 r.p.m.

There were charged into the autoclave 2000 grams of a technical grade of polyethyleneglycol 600. There was added 40 grams of sodium methylate. The autoclave was sealed, and swept with nitrogen gas. Heat was applied with stirring so as to get an appropriate suspension or solution of catalyst. The temperature was allowed to rise to 142° C. At this point the addition of butylene oxide (isobutylene oxide free) was started. The addition was continuous until approximately 7800 grams of butylene oxide were added. The butylene oxide was added at a comparatively slow rate and required 7½ hours for addition. This operation could have been speeded up but it was preferred to use a slow addition rate. During this period the temperature was maintained at 140° to 160° C., using cooling water through the inner coils when necessary and otherwise applying heat if required. The maximum pressure during the reaction was approximately 50 pounds per square inch. This represented the addition of approximately 32 moles of butylene oxide per mole of initial glycol. The product was substantially insoluble in water. It is doubtful if this mixture contained even a small amount of somewhat water soluble material and even if there happened to be a small amount of water soluble material it was eliminated by following the procedure outlined in the next two examples.

*Example 2aa*

The same procedure was followed as in Example 1aa but instead of using 7.8 kilograms of butylene oxide there was added 20% more, to wit, 9.4 kilograms of butylene oxide. The amount of catalyst used was increased to 50 grams. The reaction temperature was 10 hours. Otherwise the operating conditions were approximately the same as in Example 1aa. The final product seemed to be completely free from even small amounts of water-soluble materials.

*Example 3aa*

The same procedure was followed as in Examples 1aa and 2aa, preceding, except that the amount of catalyst was increased to 75 grams and the amount of butylene oxide added was increased to 11.0 kilograms. The time period was 13.5 hours.

The product so obtained seemed to be free from any water-soluble material.

In a number of instances a commercial product, such as polyethyleneglycol 200, or 300, or 400, or other examples for that matter, were subjected to the same procedures as described in Examples 1aa, 2aa and 3aa. Added examples of this kind are included in Examples 4aa through 6aa, wherein polyethyleneglycol 350 was used. The data in regard to these additional tests and other examples are included in Table II. Polyethyleneglycol 350 represents approximately 7.5 moles of ethylene oxide combined with one mole of water.

TABLE IV

| Ex. No. | Molec. weight of initial glycol used | Molec. weight of moles of butylene oxide added | Moles of butylene oxide added per mole of polyethyleneglycol | Distribution of alkylene oxide residues in product, percent ||
|---|---|---|---|---|---|
| | | | | Ethylene oxide | Butylene oxide |
| 4aa | 350 | 970 | 13.5 | 28.2 | 71.8 |
| 5aa | 350 | 1,160 | 16.1 | 24.8 | 75.2 |
| 6aa | 350 | 1,350 | 18.75 | 22.0 | 78.0 |

In the above examples the amounts used were grams. The same procedure was repeated, however, using ten times the weights in each instance, i.e., starting with 3500 grams and adding 10 kilograms, or even more as indicated, of butylene oxide.

Further examples of oxybutylated polyethylene glycols appear as points on the graph of FIGURE 24 of my co-pending application Serial No. 677,982, filed August 13, 1957. A representative number of these glycols are presented in tabular form below:

TABLE VI

| Ex. No. | Ethylene oxide in initial glycol, moles | Butylene oxide added, moles | Mol. weight of product excluding mole of H₂O |
|---|---|---|---|
| 11aa | 6 | 6 | 696 |
| 12aa | 6 | 12 | 1,128 |
| 13aa | 9 | 9 | 1,044 |
| 14aa | 9 | 25 | 3,196 |
| 15aa | 12 | 6 | 960 |
| 16aa | 14 | 35 | 3,136 |
| 17aa | 15 | 9 | 1,308 |
| 18aa | 17 | 6 | 1,180 |
| 19aa | 17 | 15 | 1,828 |
| 20aa | 21 | 6 | 1,356 |
| 21aa | 21 | 12 | 1,788 |
| 22aa | 22 | 21 | 2,480 |
| 23aa | 24 | 6 | 1,488 |
| 24aa | 24 | 18 | 2,352 |
| 25aa | 33 | 6 | 1,884 |
| 26aa | 33 | 15 | 2,532 |

In the above examples the amounts used were gram-moles.

In the following Table V, the weights are shown in pounds. The amount of catalyst and oxyalkylation temperatures, time periods and other conditions were about the same as previously described. In the examples of Table V, the starting material was one pound mole of ethylene glycol and to this was added successively ethylene oxide and butylene oxide in the amounts shown.

TABLE V

| Ex. No. | Ethylene glycol/lbs. | Ethylene oxide/lbs. | Butylene oxide/lbs. | Molecular weight of product |
|---|---|---|---|---|
| 7aa | 62 | 371 | 65 | 498 |
| 8aa | 62 | 786 | 130 | 978 |
| 9aa | 62 | 1,201 | 195 | 1,458 |
| 10aa | 62 | 1,616 | 260 | 1,938 |

PART 2

Subdivision C

OXYALKYLATION WITH PROPYLENE AND BUTYLENE OXIDES

As to the use of the two oxides in combination, either as mixtures or by the use of one and then the other, or in combination as, for example, starting with propylene oxide, using some butylene oxide and then propylene oxide again; or, inversely, using butylene oxide, then some propylene oxide, and then butylene oxide again, one can make an approximate prediction based on what has appeared in Divisions A and B preceding.

It is obvious that if one were to take a mixture consisting of 19 moles of propylene oxide and one mole of butylene oxide, and proceed to oxyalkylate, for all practical purposes the results would be comparable to those described in Division A. Inversely, if one employed a mixture of 19 moles of butylene oxide and one mole of propylene oxide, the results obtained would be comparable to Division B. Indeed, if one oxybutylates so as to introduce 4, 5 or 6 moles of butylene oxide and then one mole of propylene oxide and then goes back to 4, 5 or 6 moles of butylene oxide again, and then one of propylene oxide, one can hardly detect any difference between the use of such combination and the use of butylene oxide alone. Where mixtures of propylene and butylene oxides are used and neither oxide is in large excess over the other, however, the properties of the final material will be intermediate between the properties of products made using either of the oxides alone. It is also obvious that if one uses a mixture instead of a stepwise oxyalkylation, random oxyalkylation takes place but in a general way the propylene oxide (everything else being equal) is apt to react more rapidly than the butylene oxide because by and large it is more reactive. Reference to butylene oxide in absence of any indication to the contrary is to the mixture of the two isomers referred to in Division B and is concerned with an oxide which is substantially free from isobutylene oxide.

It is unnecessary to point out that oxyalkylation using mixtures of oxides is conducted in substantially the same manner as propylene oxide or butylene oxide alone.

In Tables VII, VIII, IX and X, which follow, the weights are shown in grams, to wit, starting for example (Table VII) with 250 grams of the glycol and adding approximately 2000 grams of propylene oxide and then approximately 2500 grams of butylene oxide. The amount of catalyst added at the beginning of the oxyalkylation was such that the total catalyst present, both residual if any from a previous oxyalkylation, and the added amount approximated 1% to 2% of caustic soda or sodium methylate. Oxyalkylation temperatures and time periods were about the same as previously described and are not critical. A large number of the examples were repeated using a ten-fold amount of the initial reactant and a ten-fold amount of the oxides. The ratio given previously in this paragraph applies to Example 1aaa. As previously noted, this applies to Examples 1aaa through and including 48aaa.

TABLE VII

| Ex. No. | Mol. weight initial glycol used | Weight of propylene oxide added/mole | Moles of propylene oxide added/mole | Moles of butylene oxide added after addn. of propylene oxide | Molec. weight after addn. of butylene oxide | Distribution of alkylene oxide residues in product, percent | | |
|---|---|---|---|---|---|---|---|---|
| | | | | | | Ethylene oxide | Propylene oxide | Butylene oxide |
| 1aaa | 250 | 2,030 | 35 | 3.5 | 2,532 | 9.9 | 79.9 | 10.2 |
| 2aaa | 250 | 2,030 | 35 | 7.0 | 2,784 | 9.0 | 72.9 | 18.1 |
| 3aaa | 250 | 2,030 | 35 | 10.5 | 3,036 | 8.3 | 66.8 | 24.9 |
| 4aaa | 250 | 2,436 | 42 | 4.2 | 2,990 | 8.3 | 81.5 | 10.2 |
| 5aaa | 250 | 2,436 | 42 | 8.4 | 3,295 | 7.6 | 73.9 | 18.5 |
| 6aaa | 250 | 2,436 | 42 | 12.6 | 3,600 | 6.9 | 67.7 | 25.4 |
| 7aaa | 250 | 2,842 | 49 | 4.9 | 3,445 | 7.3 | 82.6 | 10.1 |
| 8aaa | 250 | 2,842 | 40 | 9.8 | 3,798 | 6.6 | 74.8 | 18.6 |
| 9aaa | 250 | 2,842 | 49 | 14.7 | 4,150 | 6.0 | 68.6 | 25.4 |

Similarly, in another series comparable to the series above, instead of adding the indicated amount of propylene oxide, 5% less by weight, was added, 10% less, 15% less, 25% and 30% less, and replaced in turn by an equal weight of butylene oxide. These derivatives are identified as 10aaa through 24aaa.

TABLE VIII

| Ex. No. | Mol. weight initial glycol used | Weight of propylene oxide added/mole | Weight of butylene oxide added/mole | Moles of propylene oxide added/mole | Moles of butylene oxide added/mole | Molec. weight of final product | Distribution of alkylene oxide residues in products, percent | | |
|---|---|---|---|---|---|---|---|---|---|
| | | | | | | | Ethylene Oxide | Propylene Oxide | Butylene Oxide |
| 10aaa | 250 | 1,928.5 | 101.5 | 33.3 | 1.32 | 2,280 | 11.0 | 84.2 | 4.4 |
| 11aaa | 250 | 1,827.0 | 203.0 | 21.5 | 2.72 | 2,280 | 11.0 | 80.1 | 8.9 |
| 12aaa | 250 | 1,725.5 | 304.5 | 29.8 | 4.04 | 2,280 | 11.0 | 75.6 | 13.4 |
| 13aaa | 250 | 1,522.5 | 507.5 | 26.7 | 6.55 | 2,280 | 11.0 | 66.6 | 22.4 |
| 14aaa | 250 | 1,421.0 | 609.0 | 24.5 | 8.18 | 2,280 | 11.0 | 62.3 | 26.7 |
| 15aaa | 250 | 2,314.2 | 121.8 | 40.0 | 1.65 | 2,686 | 9.3 | 86.3 | 4.4 |
| 16aaa | 250 | 2,182.4 | 243.6 | 38.8 | 3.27 | 2,686 | 9.3 | 81.7 | 9.0 |
| 17aaa | 250 | 2,070.0 | 366.0 | 35.7 | 4.90 | 2,686 | 9.3 | 77.2 | 13.5 |
| 18aaa | 250 | 1,827.0 | 609.0 | 31.5 | 8.15 | 2,686 | 9.3 | 68.0 | 22.7 |
| 19aaa | 250 | 1,714.0 | 722.0 | 29.5 | 9.78 | 2,686 | 9.3 | 63.8 | 26.9 |
| 20aaa | 250 | 2,700.0 | 142.1 | 46.5 | 1.92 | 3,092 | 8.1 | 87.3 | 4.6 |
| 21aaa | 250 | 2,559.0 | 284.2 | 44.0 | 3.81 | 3,092 | 8.1 | 82.8 | 9.1 |
| 22aaa | 250 | 2,415.0 | 427.0 | 41.5 | 5.22 | 3,092 | 8.1 | 78.0 | 13.9 |
| 23aaa | 250 | 2,132.0 | 710.0 | 36.7 | 9.55 | 3,092 | 8.1 | 68.9 | 23.0 |
| 24aaa | 250 | 1,987.0 | 855.0 | 34.3 | 11.41 | 3,092 | 8.1 | 64.3 | 27.6 |

Reference is made to Table IV in Subdivision B. The same variants can be prepared as in the case of Table VII preceding. In other words, after the butylene oxide has been added one can proceed to add 5% more, 10% more, or 15% more of propylene oxide based on a molal ratio. All of which is shown in Table IX which can be compared, as previously noted, with Table VII.

Similarly, a second series have been prepared comparable to the above in the same way that the series summarized in Table VIII corresponds to the series summarized in Table VII. Here, again, is the addition of butylene oxide of 5% less by weight, 10% less, 15% less, 20% less, and 30% less, and replaced in turn by an equal weight of propylene oxide. These derivatives are indicated in the series 34aaa through 48aaa.

TABLE IX

| Ex. No. | Derived from Ex. No. | Mol. weight initial glycol used | Wt. of Butylene oxide added mole | Moles of butylene oxide added mole | Moles of Propylene oxide added after addn. of butylene oxide | Molec. weight after addn. of Propylene oxide | Distribution of alkylene oxide residues in product, percent | | |
|---|---|---|---|---|---|---|---|---|---|
| | | | | | | | Ethylene oxide | Propylene oxide | Butylene oxide |
| 25aaa | 4aa | 350 | 970 | 13.5 | 1.35 | 1,398 | 25.1 | 4.4 | 69.5 |
| 26aaa | 4aa | 350 | 970 | 13.5 | 2.70 | 1,476 | 23.7 | 10.5 | 65.8 |
| 27aaa | 4aa | 350 | 970 | 13.5 | 4.05 | 1,555 | 22.5 | 15.1 | 62.4 |
| 28aaa | 5aa | 350 | 1,160 | 16.0 | 1.61 | 1,603 | 21.8 | 5.8 | 72.4 |
| 29aaa | 5aa | 350 | 1,160 | 16.1 | 3.22 | 1,697 | 20.6 | 10.9 | 68.5 |
| 30aaa | 5aa | 350 | 1,160 | 16.1 | 4.83 | 1,790 | 19.5 | 15.7 | 64.8 |
| 31aaa | 6aa | 350 | 1,350 | 18.5 | 1.85 | 1,807 | 9.4 | 5.8 | 4.8 |
| 32aaa | 6aa | 350 | 1,350 | 18.5 | 3.70 | 1,914 | 8.3 | 11.2 | 70.5 |
| 33aaa | 6aa | 350 | 1,350 | 18.5 | 5.55 | 2,022 | 17.3 | 16.1 | 66.6 |

TABLE X

| Ex. No. | Mol. weight initial glocol used | Weight of butylene oxide added/ mole | Weight of propylene oxide added/ mole | Moles of butylene oxide added/ mole | Moles of propylene oxide added/ mole | Molec. weight of final product | Distribution of alkylene oxide residues in product, percent | | |
|---|---|---|---|---|---|---|---|---|---|
| | | | | | | | Ethylene oxide | Propylene oxide | Butylene oxide |
| 34aaa | 350 | 921.5 | 48.5 | 12.83 | .87 | 1,320 | 26.6 | 3.7 | 69.2 |
| 35aaa | 350 | 873.0 | 97.0 | 12.15 | 1.73 | 1,320 | 26.6 | 7.4 | 66.0 |
| 36aaa | 350 | 825 | 145 | 11.38 | 2.72 | 1,320 | 26.6 | 11.0 | 62.4 |
| 37aaa | 350 | 728 | 242 | 10.12 | 5.35 | 1,320 | 26.6 | 18.3 | 55.1 |
| 38aaa | 350 | 679 | 291 | 9.45 | 5.21 | 1,320 | 26.6 | 22.0 | 51.4 |
| 39aaa | 350 | 1,102 | 58 | 15.3 | 1.07 | 1,510 | 23.2 | 3.7 | 73.1 |
| 40aaa | 350 | 1,044 | 116 | 14.5 | 2.03 | 1,510 | 23.2 | 7.7 | 70.0 |
| 41aaa | 350 | 986 | 174 | 13.7 | 3.15 | 1,510 | 23.2 | 11.5 | 65.3 |
| 42aaa | 350 | 880 | 280 | 12.5 | 4.55 | 1,510 | 23.2 | 18.5 | 58.3 |
| 43aaa | 350 | 812 | 348 | 11.3 | 6.22 | 1,510 | 23.2 | 23.1 | 53.7 |
| 44aaa | 350 | 1,283 | 67.5 | 17.5 | 1.18 | 1,700 | 20.6 | 4.0 | 75.4 |
| 45aaa | 350 | 1,215 | 135 | 16.65 | 2.38 | 1,700 | 20.6 | 8.0 | 71.4 |
| 46aaa | 350 | 1,138 | 212 | 15.7 | 3.58 | 1,700 | 20.6 | 12.6 | 66.9 |
| 47aaa | 350 | 1,012 | 338 | 13.9 | 5.97 | 1,700 | 20.6 | 19.9 | 59.5 |
| 48aaa | 350 | 945 | 405 | 12.9 | 7.18 | 1,700 | 20.6 | 23.8 | 55.6 |

In the following Tables XI and XII, the weights are shown in pounds. The amount of catalyst and oxyalkylation temperatures and time periods and other conditions were about the same as previously described and are not critical. In the examples of Table XI the starting material was one pound mole of ethylene glycol (62 pounds and equal to 18 pounds of water and 44 pounds of ethylene oxide) and to this was added successively ethylene oxide, propylene oxide and butylene oxide in the amounts shown.

In the examples of Table XII the starting material was also one pound mole of ethylene glycol and to this was added successively ethylene oxide, propylene oxide and butylene oxide in the amounts shown.

TABLE XI

| Ex. No | Ethylene glycol/lbs. | Ethylene oxide/lbs. | Propylene oxide/lbs. | Butylene oxide/lbs. | Molecular weight of product |
|---|---|---|---|---|---|
| 49aaa | 62 | 396 | 480 | 80 | 1,018 |
| 50aaa | 62 | 836 | 960 | 160 | 2,018 |
| 51aaa | 62 | 1,277 | 1,440 | 240 | 3,018 |
| 52aaa | 62 | 1,716 | 1,920 | 320 | 4,018 |
| 53aaa | 62 | 481 | 425 | 50 | 1,018 |
| 54aaa | 62 | 1,006 | 850 | 100 | 2,018 |
| 55aaa | 62 | 1,531 | 1,275 | 150 | 3,018 |
| 56aaa | 62 | 2,056 | 1,700 | 200 | 4,018 |

TABLE XII

| Ex. No. | Ethylene glycol/lbs. | Ethylene oxide/lbs. | Butylene oxide/lbs. | Propylene oxide/lbs. | Molecular weight of product |
|---|---|---|---|---|---|
| 61aaa | 62 | 371 | 65 | 520 | 1,018 |
| 62aaa | 62 | 786 | 130 | 1,040 | 2,018 |
| 63aaa | 62 | 1,201 | 195 | 1,560 | 3,018 |
| 64aaa | 62 | 1,616 | 260 | 2,080 | 4,018 |

The following examples illustrate the preparation of products of this invention where the polyoxyethylene glycol is reacted with mixtures of propylene and butylene oxides.

*Example 65aaa*

The reaction vessel employed was a stainless steel autoclave with the usual devices for heating, heat control, stirrer, inlet, outlet, etc., which are conventional in this type of apparatus. The stirrer operated at approximately 250 r.p.m. There were charged into the autoclave 30 pounds of polyethylene glycol–300. There was added .06 pound of sodium methylate. The autoclave was sealed and swept with nitrogen gas. Heat was applied with stirring so as to get an appropriate solution or suspension of catalyst. The temperature was allowed to rise to 130° C. At this point addition of a mixture of butylene oxide and propylene oxide, wherein the mole ratio was 1 mole of butylene oxide to 2 moles of propylene oxide, was begun. Addition of the butylene oxide-propylene oxide mixture was continuous until 37½ pounds of the mixture had been added. This represents the addition of approximately 2 moles of propylene oxide and 4 moles of butylene oxide per mole of initial reactant.

*Example 66aaa*

The same general procedure was followed as in Example 1 except that the addition of the final butylene-oxide propylene oxide mixture was continued until the

Example 67aaa

The same procedure was followed as in Examples 1 and 2 preceding, except that the addition of the butylene oxide-propylene oxide mixture was continued until the equivalent of 6 moles of butylene oxide and 12 moles of propylene oxide per mole of initial reactant had been added.

PART 3

The polycarboxy acids used may have two or more carboxyl groups. When using a dicarboxy acid or anhydride that has only two carboxyl groups or the equivalent, one usually does not have difficulty from the standpoint of cross-linking or gelation. Therefore, the preference is to employ dicarboxy acids. Actually, as previously noted, due to the long chain length between the hydroxyl groups there is comparatively little danger of cross-linking or gelation to the stage where an insoluble product is obtained even when tricarboxy and tetracarboxy acids are employed. The dicarboxy acids may be comparatively low molal acids or high molal acids.

Dicarboxy acids may have as many as 32 carbon atoms and even more, particularly when derived by the oxidation of wax or by other procedures as subsequently noted. Common well known dicarboxy acids having 8 carbon atoms or more (excluding carboxyl group carbon atoms) are sebacic acid, methylene disalicylic acid, etc. Comparable disalicylic acids have been obtained by introducing an alkyl substituent having not over 10 carbon atoms into both phenolic nuclei.

Other well known types of dibasic acids are those derived from maleic anhydride and are known as adduct acids. Examples are the products obtained by reaction between maleic anhydride and terpenes to yield well known adduct acids having the hydrophobe characterization above described. Monocarboxy acids, such as sorbic acid, can be reacted in a comparable manner with an unsaturated fatty acid such as linolenic acid to give a suitable reactant. Other types can be obtained from compounds comparable to Clocker adducts involving addition next to an unsaturated bond but not involving the bond as such, as for example where oleic acid is used as one of the initial reactants. Sometimes the production of the adduct acid yields as an initial stage the anhydride. Obviously the anhydride can be reacted with water to give the parent acid.

A variety of dimerized fatty acids have been obtained and are described in the patent literature. See, for example, U.S. Patent No. 2,417,739, dated March 18, 1947, to De Groote, and more particularly U.S. Patent No. 2,632,695, dated March 24, 1953, to Landis et al.

An analogous variety of dicarboxy acids are obtained from abietic acid or the like and generally referred to as dimerized rosin acids. Dimerized acids have been obtained from fish oil fatty acids in which the total number of carbon atoms may have varied from 20 to 24 and thus the dimerized acids may have as many as 44, or even more, carbon atoms. The same applies to certain dimerized acids obtained from the oxidation of wax. Furthermore, esters of dimerized acids have been reacted with aromatic materials such as alkylated or polyalkylated naphthalene in the presence of aluminum chloride, or the like, to yield dicarboxy acids having as many as 50 carbon atoms.

Referring to a consideration of dimeric fatty acids one may illustrate this structure by the following composition:

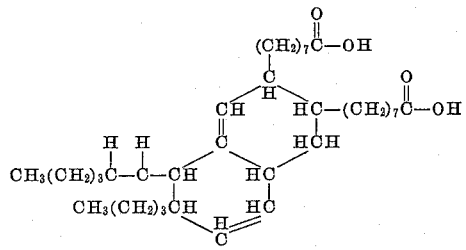

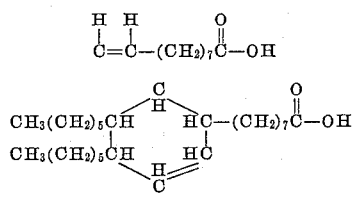

The acids produced commercially run approximately 85% or better dimer content with some trimer and some monomer. As pointed out in aforementioned U.S. Patent No. 2,632,695, a well-known source of these dimeric acids is the product sold by Emery Industries, Inc., and said to be dilinoleic acid. In the literature published by the Emery Industries, Inc., the properties of this product are given as follows:

| | |
|---|---|
| Neutral equivalent | 290–310. |
| Iodine value | 80–95. |
| Color | Gardner 12 (max.). |
| Dimer content | Approx. 85%. |
| Trimer and higher | Approx. 12%. |
| Monomer | Approx. 3%. |

It is known that mono-olefinic hydrocarbons react by what is termed the 1,2-addition reaction, with compounds containing an ethylenic group linked directly and in conjugated relation to a carbonyl group such as maleic acid anhydride to give unsaturated compounds. The reaction is shown by Eichwald in U.S. Patent 2,055,456 as well as by Moser in U.S. Patents 2,124,628; 2,133,734; and 2,230,005. The reaction is also disclosed in an application of Van Melsen, Serial No. 263,056, filed March 20, 1939. In each case, the condensation or addition products obtained by the 1,2-addition reaction are unsaturated compounds. This disclosed reaction may be illustrated, for example, by that which occurs in the reaction of octadecylene with maleic anhydride. The reaction may be represented as follows:

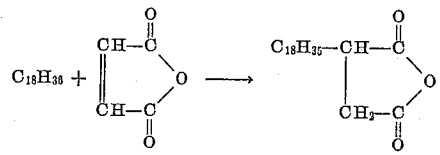

It is seen that the product is unsaturated, being an alkenyl succinic acid anhydride.

Alkenyl succinic acids are produced by various procedures and particularly by condensing maleic acid anhydride with $C_{12}$ and higher mono-olefines, hydrolyzing the reaction product and hydrogenating the hydrolyzed material to remove olefinic double bonds.

Similarly, another class of analogous compounds are substituted malonic acids such as cetyl malonic acid, stearyl malonic acid, oleyl malonic acid, octyl cetyl malonic acid, etc.

Other suitable dicarboxy acids are illustrated by

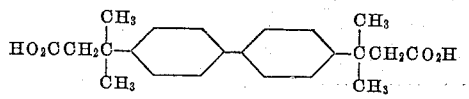

See U.S. Patent No. 2,497,673, dated February 14, 1950, to Kirk. See also U.S. Patent No. 2,369,640, dated February 20, 1945, to Barnum. This particular patent illustrates a dicarboxy acid of the ether type, such as the following:

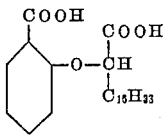

Another variety is illustrated in U.S. Patent No. 2,459,717, dated January 18, 1949, to Perry. An example of this particular variety is the following:

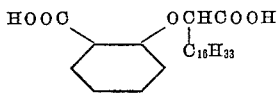

Note also the variety of polycarboxy acids, many of which are dicarboxy acids, described in U.S. Patent No. 2,349,044, dated May 16, 1944, to Jahn.

Also note U.S. Patent No. 2,182,178 describes isododecylene succinic acid anhydride, isononylene succinic acid anhydride, isotetradecylene succinic anhydride, etc.

As to a description of a number of other suitable dicarboxy acids derived from various raw materials reference is made to the following patents: U.S. Patent Nos. 1,702,002; 1,721,560; 1,944,731; 1,933,025; 2,230,005; 2,232,435; 2,368,602; 2,402,825; 2,490,744; 2,514,533; and 2,518,495.

Note that U.S. Patent No. 2,360,426 describes the production of a higher alkene-substituted dicarboxylic acid of the general formula

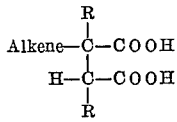

in which R is selected from the group consisting of hydrogen and alkyl radicals, and Alkene is an alkene group having not less than 5 and not more than 16 carbon atoms, which comprises heating an alkyl halide containing not less than 5 and not more than 16 carbon atoms with an unsaturated aliphatic dicarboxylic acid of the general formula:

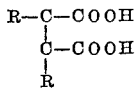

in which R is selected from the group consisting of hydrogen and alkyl radicals, at a temperature at which hydrogen halide is split out.

It particularly describes in detail the preparation of decene-succinic acid, undecene-succinic acid, and dodecene-succinic acid, all of which are particularly desirable for the present purpose.

The above specifically described dicarboxy acids are characterized by the presence of at least one hydrocarbon group containing at least 8 carbon atoms and are relatively high molal acids. However, one can also produce excellent compounds by the use of low molal dicarboxy acids alone or in combination with high molal dicarboxy acids. Examples of such low molal dicarboxy acids are succinic acid, glutaric acid, adipic acid, pamelic acid, suberic acid, and azelaic acid. Similarly, one may use cyclic acids such as phthalic acid, isophthalic acid, and terephthalic acid. One can also use tetrahydrophthalic anhydride and hexahydrophthalic anhydride.

As is well known one can obtain low molal glycols such as ethyleneglycol, diethyleneglycol, triethyleneglycol, propyleneglycol, dipropyleneglycol, tripropyleneglycol, butyleneglycol, etc. Such products can be converted into dicarboxy acids by either one of two well known procedures. Reaction with acrylonitrile or with chloroacetic acid can be used. In the use of acrylonitrile the terminal hydroxyl hydrogen atom is replaced by the radical

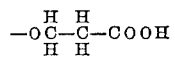

In the use of chloroacetic acid the terminal hydrogen atom is replaced by

I have found that for many purposes including demulsification the most effective compounds are obtained from reactants characterized by freedom from any radical having 8 carbon atoms or more. For this reason, it is our preference to use low molal dicarboxy acids and particularly glycolic acid, ethylene bis (glycolic acid) of the formula $HOOCCH_2OCH_2CH_2OCH_2COOH$, oxalic acid, provided decomposition is avoided, and other low molal acids such as succinic acid or maleic acid.

Previous reference has been made to the use of the acids. Needless to say, any one of a number of functional equivalents such as the anhydride, an ester, an amide, or the like, may be used to replace the acid. Indeed, many of the acids are more readily available in the anhydride form than the acid form.

What has been said in regard to the dicarboxy acids applies of course to the polycarboxy acids although the number available at comparatively low prices is somewhat limited. Here, again, however, the variety used may be large and thus particularly of interest are low molal acids such as tricarballylic acid, aconitic acid, and tetracarboxy butane. Other acids are obtainable such as Diels-Alder adducts, Clocker adducts, and the like. They include, among others, examples of tetracarboxy acids described in U.S. Patent No. 2,329,432, dated September 14, 1943, to Bruson. As examples of the ketonic tetracarboxylic acids they are described as follows:

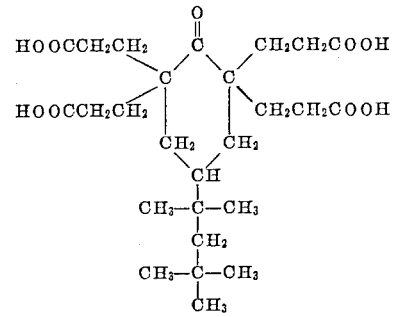

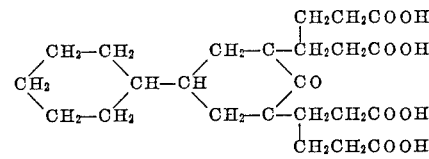

Various aryl tetracarboxylic acid anhydrides which can be readily converted into the corresponding acids are described in U.S. Patent 2,625,555, dated January 13, 1953, to Miller.

Suitable tetracarboxy aderivatives are described in U.S. Patent No. 2,450,627, dated October 5, 1948, to Bloch. Such acids are obtained by a process which comprises heating at a temperature of from about 100° C. to about 350° C. in the presence of an aqueous alkaline reagent the adduct of a dienophilic dibasic acidic compound and a cyclic polyolefinic hydrocarbon containing isolated unsaturation and at least some conjugated unsaturation, and acidifying the polymer product formed in the said heating step to form said tetra-basic acid.

Comparable to the ketonic carboxylic acids above described are the ketonic tricarboxylic acids. See U.S. Patent No. 2,320,217, dated May 25, 1943, to Bruson. Examples are as follows:

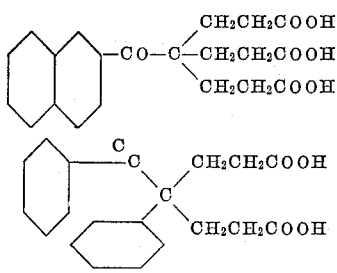

Substituted pimelic acids having 3 carboxyl radicals are described in U.S. Patent No. 2,339,218, dated January 11, 1944, to Bruson. An example is the following:

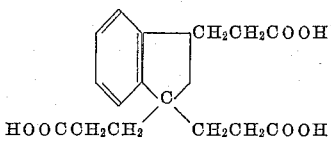

A variety of tricarboxylic acids which are of particular interest is obtained by reaction between maleic anhydride and a suitable unsaturated acid, such as linolenic acid. There are two types, depending on the nature of the unsaturation of the fatty acid employed. One well known type is the type commonly referred to as Clocker adducts and described in considerable detail in U.S. Patents Nos. 2,188,883; 2,188,884; 2,188,885; 2,188,886; 2,188,887; 2,188,888; 2,188,889; and 2,188,890, all dated January 30, 1940, to Clocker. An example of such well known reaction is the following:

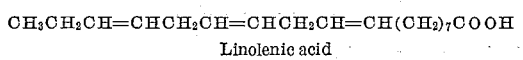
Linolenic acid

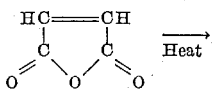
Maleic anhydrides

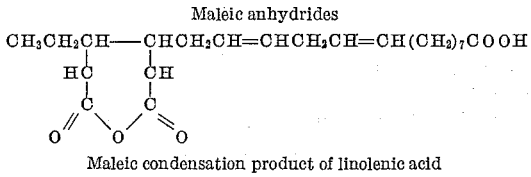
Maleic condensation product of linolenic acid

As to similar products more akin to Diels-Alder derivatives see U.S. Patent No. 2,124,628, dated July 26, 1938, to Moser.

See, also, U.S. Patent No. 2,264,354, dated December 2, 1941, to Alder et al.

Another tricarboxylic acid is described in U.S. Patent No. 2,517,563, dated August 8, 1950, to Harris.

Other suitable examples are described in U.S. Patents Nos. 2,390,024, dated November 27, 1945, to Bruson; 2,359,980, dated October 10, 1944, to Fleck; and 2,039,243 dated April 28, 1936, to Krzikalla et al.

PART 4

Part 4 is concerned with the esters, either monomeric or polymeric, obtained from the glycols prepared in the manner described in Part 2, and the polycarboxy acids described in Part 3. One may use any obvious equivalent instead of a polycarboxy acid such as the anhydride, the acyl chloride, or an ester. One may follow a procedure so the product is largely a monomer; for instance, if one uses the ratio of two parts of polycarboxy acid to one part of glycol the reaction yields a fractional ester having free carboxyl radicals. Inversely, if one uses two moles of the glycol and one mole of a dicarboxy acid one obtains principally a monomer which is a fractional ester having free hydroxyl radicals. If, on the other hand, one selects a one-to-one ratio of a dicarboxy acid and a glycol the tendency is to produce linear polymers, particularly if an effort is made to conduct the reaction as far as it will go without decomposition. A variety of intermediates can be obtained which vary in molecular weight. All of this is simple conventional procedure and information concerning such procedure has appeared repeatedly in numerous patents. See, for example, the description in U.S. Patent No. 2,562,878, dated August 7, 1951, to Blair. In the instant procedure one can follow the same method outlined in the text beginning in column 4, line 62.

Similarly, U.S. Patent No. 2,679,516, dated May 25, 1954, to De Groote, describes a procedure for making fractional esters but the obvious variation in molal ratio of glycol to reactant corresponding, for example, to the ratios in the aforementioned Blair patent, produce polymers. Particular attention is directed to Part 3 of said patent. Note that a procedure is included for removing the slight amount of alkali which may remain from the oxyalkylation procedure. In the examples which are summarized in Table XIII the excess of alkali was eliminated entirely, or for all practical purposes, by using the procedure outlined in the aforementioned De Groote patent in column 19 beginning at line 11. In other examples particularly where the final alkali content was low no effort was made to remove the alkali but enough of the carboxy acid was added in excess over the amount employed for esterification purposes to neutralize the alkali. This is particularly satisfactory when low molal polycarboxy acids are used and especially dicarboxy acid.

In practically all cases the esterification took place readily by using temperatures of 90°–125° C. and a reaction time of 3 to 6 hours. The particular equipment employed was a resin pot as described in aforementioned De Groote Patent 2,679,516, in the second paragraph of Part 3. If the reaction does not proceed rapidly then sometimes a small amount of sulfonic acid, either an alkane sulfonic acid or an aromatic sulfonic acid, is employed. The amount used varies from a few tenths percent up to one percent or even more. Such use is dependent in part on whether or not the residual catalyst would be objectionable. When the carboxy acid reactants are fairly strong acids they, of course, serve as their own catalyst. In other instances the reaction has been speeded up by passing just a slow stream of dry hydrochloric acid gas through the mixture. Any suitable and conventional method of esterification commonly employed in producing esters, both monomeric or linear, from polycarboxy acids and glycols can be employed.

Previous reference has been made to the solubility of the esters. They may be water soluble but in most instances they will be organic solvent-soluble or at least soluble in a mixture of the kind described as useful in the test for emulsifiability set forth in U.S. Patent 2,499,368, dated March 7, 1950, to De Groote and Keiser. In other words, the same solvents or mixtures which serve for the solution of the glycols also serve for solution of the esters. The esters as produced will vary in color from almost water-white or pale straw, to a darker color depending in part on the polycarboxy acids used. For instance, dimeric fatty acids tend to give darker colored esters than some other acids. The esters can be bleached by any conventional method, such as those previously mentioned for bleaching glycols, i.e., filtering clays, chars, and even organic bleaches such as peroxides or the like. For most applications there is no need to bleach the products and there is no need to remove the small amounts of salts if present due to neutralization of a catalyst. After mixing with a suitable solvent the solution may be allowed to stand in a quiescent state until any insolubles separate by settling.

*Example 1b*

The polyalkylene glycol employed was that of Example 17a from Table III. The theoretical molecular weight of the glycol was 2312. The acid used for esterification was diglycolic acid. The ratio of acid to glycol employed was 0.72:1. The amount of glycol used was 100 grams. The amount of diglycolic acid employed was 4.5 grams. Esterification was conducted by means of a glass resin pot using the conventional stirrer, inlet, outlet, and phase-separating trap. The maximum temperature during the esterification was 125° C. The time of esterification was 6 hours. If a solvent is employed, such solvent can be removed readily by distillation, particularly vacuum distillation. In some instances it is desirable to use a variant of this procedure employing both benzene, as a dehydrating agent and also as the solvent during the reflux period, in combination with a high boiling aromatic petroleum solvent. This procedure is described in detail in columns 1 and 2 of U.S. Patent No. 2,679,510, dated May 25, 1954, to De Groote.

Example 1b, together with other examples, appears in tabular form in Table XIII following. In all of the examples, the amount of glycol used was 100 grams and the amount of acid used was 4.5 grams.

| Ex. No. of ester | Ex. No. of glycol | Mol. weight of glycol | Acid or anhydride | Mol. weight of acid | Molal ratio, acid to glycol |
|---|---|---|---|---|---|
| 1b | 15a | 630 | Diglycolic | 134 | .21 |
| 2b | 15a | 620 | Maleic | 98 | .29 |
| 3b | 16a | 1,442 | Phthalic | 148 | .44 |
| 4b | 16l | 1,442 | Diglycolic | 134 | .48 |
| 5b | 17a | 2,312 | ___do___ | 134 | .78 |
| 6b | 18a | 3,472 | ___do___ | 134 | 1.17 |
| 7b | 19a | 1,026 | Maleic | 98 | .47 |
| 8b | 20a | 2,068 | Azelaic | 188 | .49 |
| 9b | 20a | 2,068 | Dodecenyl succinic | 266 | .35 |
| 10b | 21a | 3,288 | Diglycolic | 134 | 1.10 |
| 11b | 21a | 3,288 | Dimeric fatty acid | 600 | .25 |
| 12b | 21a | 3,288 | Phthalic | 148 | 1.00 |
| 13b | 22a | 1,698 | Hexahydrophthalic | 154 | .50 |
| 14b | 22a | 1,698 | Aconitic | 174 | .44 |
| 15b | 23a | 2,858 | ___do___ | 174 | .74 |
| 16b | 23a | 2,858 | Diglycolic | 134 | .96 |
| 17b | 24a | 4,598 | ___do___ | 134 | 1.54 |
| 18b | 25a | 2,340 | ___do___ | 134 | .79 |
| 19b | 25a | 2,340 | Tricarballylic | 176 | .60 |
| 20b | 25a | 2,340 | Maleic | 98 | 1.08 |
| 21b | 26a | 2,170 | ___do___ | 98 | 1.00 |
| 22b | 26a | 2,170 | Trilinoleic | 835 | .12 |
| 23b | 27a | 3,852 | ___do___ | 835 | .21 |
| 24b | 27a | 3,852 | Tetracarboxy-butane | 234 | .74 |
| 25b | 28a | 3,088 | ___do___ | 234 | .59 |
| 26b | 29a | 5,408 | Diglycolic | 134 | 1.82 |
| 27b | 11aa | 714 | ___do___ | 134 | .24 |
| 28b | 12aa | 1,146 | ___do___ | 134 | .38 |
| 29b | 12aa | 1,146 | Aconitic | 174 | .30 |
| 30b | 13aa | 1,062 | ___do___ | 174 | .27 |
| 31b | 13aa | 1,062 | Azelaic | 188 | .25 |
| 32b | 14aa | 3,214 | Diglycolic | 134 | 1.08 |
| 33b | 14aa | 3,214 | Tricarballylic | 176 | .82 |
| 34b | 15aa | 978 | Maleic | 98 | .45 |
| 35b | 16aa | 3,154 | Trilinoleic | 835 | .17 |
| 36b | 17aa | 1,326 | ___do___ | 835 | .07 |
| 37b | 17aa | 1,326 | Diglycolic | 134 | .45 |
| 38b | 18aa | 1,198 | Dimeric fatty acid | 600 | .09 |
| 39b | 19aa | 1,846 | Maleic | 98 | .85 |
| 40b | 20aa | 1,374 | ___do___ | 98 | .63 |
| 41b | 20aa | 1,374 | Phthalic | 148 | .42 |
| 42b | 21aa | 1,806 | ___do___ | 148 | .55 |
| 43b | 22aa | 2,498 | Azelaic | 188 | .60 |
| 44b | 22aa | 2,498 | Dodecenyl succinic | 266 | .42 |
| 45b | 23aa | 1,506 | ___do___ | 266 | .25 |
| 46b | 24aa | 2,370 | Diglycolic | 134 | .80 |
| 47b | 25aa | 1,902 | ___do___ | 134 | .64 |
| 48b | 25aa | 1,902 | Phthalic | 148 | .58 |
| 49b | 26aa | 2,550 | ___do___ | 148 | .78 |
| 50b | 65aaa | 2,860 | Diglycolic | 134 | .96 |
| 51b | 67aaa | 7,390 | ___do___ | 134 | 2.50 |

PART 5

For the purpose of resolving petroleum emulsions of the water-in-oil type, I prefer to employ products having sufficient hydrophile character to meet at least the test set forth in U.S. Patent 2,499,368, dated March 7, 1950, to De Groote and Keiser. In said patent such test for emulsification using a water insoluble solvent, generally xylene, is described as an index of surface activity.

The above mentioned test, i.e., a conventional emulsification test, simply means that the preferred product for demulsification is soluble in a solvent having hydrophobe properties or in an oxygenated water-insoluble solvent, or a mixture containing a fraction of such solvent with the proviso that when such solution in a hydrocarbon solvent is shaken with water the product may remain in the nonaqueous solvent or, for that matter, it may pass into the aqueous solvent. In other words, although it is xylene soluble, for example, it may also be water soluble to an equal or greater degree. This test is performed with distilled water at ordinary room temperature, for instance 22.5° C. or thereabouts.

As to the use of conventional demulsifying agents, reference is made to U.S. Patent No. 2,626,929, dated January 7, 1953, to De Groote, and particularly to Part 3. Everything that appears therein applies with equal force and effect to the instance process, noting only that where reference is made to Example 13b in said text beginning in column 15 and ending in column 18, the products of the present invention are employed instead.

In general, the products of this invention which have been found most effective in the resolution of petroleum emulsions of the water-in-oil type are those having a molecuar weight greater than about 2,000 although some of the products having a molecular weight as low as 1,500 have been found to be effective.

The following examples of Table XIV show results obtained in the resolution of crude petroleum emulsions obtained from various sources. For all the oils selected the pipeline oil requirement was 3% basic sediment and water content (B.S. & W.) or less. In the examples, the crude oils in all instances, after demulsification at least, met this standard and in a number of instances contained a much smaller amount of foreign matter. The emulsified oils employed in the examples were as follows:

Emulsified Oil A

This was a sample obtained from Wash Tank 5, Tank Farm No. 1 of Signal Hancock Oil Company, Huntington Beach, California. The amount of emulsified water was equivalent to 25%.

Emulsified Oil B

This oil was obtained from the first lower trap of the Ten A Lease of Richfield Oil Company, North Coles Levee, in Los Angeles, California. The amount of water was equivalent to about 27%.

Emulsified Oil C

This was obtained from Southern Pacific Lease, General Petroleum Oil Company, Wilmington, California The amount of water was approximately 24%.

Emulsified Oil D

This oil was a composite from the Smith Lease, Federal Oil Company, Englewood, California, and contained approxiamtely 50% water.

Emulsified Oil E

This was from the Ideal Lease, Well No. 1, General Petroleum Company, Signal Hill, California. This emulsion contained about 60% of water.

Emulsified Oil F

This oil was a composite from the Fisher Lease of Shell Oil Company, Brea, California. It contained about 30% water.

The compounds of this invention employed as demulsifiers in the examples were as follows:

Demulsifier No. 1

3.81 pounds of triethyleneglycol were oxyethylated with 13.32 pounds of ethylene oxide and then oxypropylated with 56 pounds of propylene oxide. The oxyalkylation followed conventional procedure previously described, using sodium methylate as the catalyst. The alkaline catalyst was neutralized with lactic acid and then 2300 grams of the diol was esterified with 187.5 grams of diglycolicacid. The procedure was conventional as previously described using xylene in a phase separating trap. Esterification was continued until no further evolution of water, indicating completeness of reaction.

*Demulsifier No. 2*

This demulsifier was obtained from the same diol described above and the procedure was identical except that 137 grams of maleic anhydride was used instead of diglycolic acid.

*Demulsifier No. 3*

The diol employed was obtained by reacting 2.6 pounds of triethyleneglycol with 16.75 pounds of ethylene oxide, followed by reaction with 60.14 pounds of propylene oxide. The procedure, catalyst and neutralization were the same as described above. 2300 grams of this diol were reacted with 134 grams of diglycolic acid. The esterification procedure was the same as described above.

*Demulsifier No. 4*

The diol was obtained by reacting 21.33 pounds of triethylene glycol with 18.8 pounds of ethylene oxide and then 61.0 pounds of butylene oxide. The oxyalkylation, using the alkaline catalyst, followed the same procedure as above. The product was neutralized as noted above. 2110 grams of the diol were esterified with 804 grams of diglycolic acid, using the same procedure as noted above.

TABLE XIV

| Ex. No. | Emulsified oil No. | Demulsifier No. | Ratio of demulsifier to emulsified oil | Temp., °F. | Time, hrs. | Percent water separated |
|---|---|---|---|---|---|---|
| 1c | A | 1 | 1:8000 | 140 | 6 | 25 |
| 2c | B | 1 | 1:10,000 | 80 | 9 | 16 |
| 3c | A | 2 | 1:7500 | 145 | 10 | 25 |
| 4c | B | 3 | 1:8000 | 90 | 9 | 16 |
| 5c | A | 4 | 1:8000 | 160 | 12 | 25 |
| 6c | C | 1 | 1:13,000 | 125 | 4 | 25 |
| 7c | C | 2 | 1:13,000 | 125 | 4 | 25 |
| 8c | C | 3 | 1:13,000 | 125 | 5 | 25 |
| 9c | C | 4 | 1:13,000 | 125 | 4 | 25 |
| 10c | D | 1 | 1:13,500 | 100 | 5 | 35 |
| 11c | D | 2 | 1:13,500 | 100 | 5 | 35 |
| 12c | D | 3 | 1:13,500 | 100 | 5 | 35 |
| 13c | E | 1 | 1:10,000 | 100 | 3 | 60 |
| 14c | E | 2 | 1:10,000 | 100 | 4 | 60 |
| 15c | E | 3 | 1:10,000 | 100 | 4 | 60 |
| 16c | F | 1 | 1:10,000 | 120 | 3 | 31 |
| 17c | F | 2 | 1:10,000 | 120 | 5 | 31 |
| 18c | F | 3 | 1:10,000 | 120 | 3 | 31 |

PART 6

The esters herein described, whether monomeric or polymeric and whether having a free hydroxyl group or free carboxyl group or both, may be used for a variety of purposes. However, we have found it particularly desirable for many applications to obtain an acidic ester, whether monomeric or polymeric and neutralize with caustic soda, caustic potash, or ammonia. Likewise, we can neutralize with a water-soluble amine, such as methylamine, diethylamine, or trimethylamine or the comparable ethyl or propyl derivatives. We can also neutralize with derivatives such as hydroxylated amines including ethanolamine, diethanolamine and triethanolamine. We can also neutralize with high molal amines, as, for example, amines obtained from higher fatty acids having 8 to 18 carbon atoms. We can also neutralize with polyamines such as ethylene diamine, diethylene triamine, etc. Thus, we have been able to obtain a variety of products in which we can shift the hydrophobe-hydrophile balance to some degree, either in the hydrophobe direction or hydrophile direction. In some instances the hydrophobe-hydrophile balance may be changed comparatively little or not at all. Such derivatives obtained in the manner described may be used for breaking petroleum emulsions of the water-in-oil type. They also can be converted into derivatives of the kind subsequently described which also may be used for this same purpose. Such derivatives are useful for other purposes including the same purpose for which the herein described products are effective. The herein described products may be used for various purposes where detergens, common solvents, emulsifiers, and the like are used. They may be used as lubricants and as additives to fluids used in hydraulic brake systems; they may be used as emulsifying agents to emulsify or remove greases or dirt; they may be used in the manufacture of a variety of other materials such as soluble oils, insecticide sprays, etc.

One may use a salt of the kind described as a fuel oil additive in the manner described in U.S. Patent No. 2,553,183, dated May 15, 1951, to Caron et al. It can be used in substantially the same proportions or lower proportions and this is particularly true when used in conjunction with a glyoxalidine, or amido glyoxalidine.

An analogous use in which these products are equally satisfactory is that described in U.S. Patent No. 2,665,978, dated January 12, 1954, to Stayner et al. The amount employed is in the same proportion or lesser amounts than referred to in said aforementioned Caron et al. patent.

The second use is for the purpose of inhibiting fogs in hydrocarbon products as described in U.S. Patents No. 2,550,981 and 2,550,982, both dated May 1, 1951, and both to Eberz. Here again, it can be used in the same proportions as herein indicated or even small proportions.

A third use is to replace oil soluble petroleum sulfonates, so-called mahogany soaps, in the preparation of certain emulsions or soluble oils or emulsifiable lubricants where such mahogany soaps are employed. The cogeneric mixtures having this peculiar property serve to replace all or a substantial part of the mahogany soap.

Another use is where the product does not serve as an emulsifying agent alone but serves as an adjunct.

Briefly stated, the fourth use is concerned with use as a coupling agent to be employed with an emulsifying agent. See "The Composition and Structure of Technical Emulsions," J. H. Goodey, Roy. Australian Chem. Inst. J. & Proc., vol. 16, 1949, pp. 47–75. As stated, in the summary of this article, it states.

"The technical oil-in-water emulsion is regarded as a system of four components: the dispersion medium, consisting of the highly polar substance water; the disperse phase composed of hydrocarbons or other substances of comparatively weak polarity; the coupling agent, being an oil-soluble substance involving an hydroxyl, carboxyl or similar polar group; and the emulsifying agent, which is a water-soluble substance involving a hydrocarbon radical attached to an ionizable group."

Fifth, these materials have particular utility in increasing the yield of an oil well by various procedures which in essence involve the use of fracturing of the strata by means of liquid pressure. A mixture of these products with oil or oil in combination with a gel former alone, or a gel former and finely divided mineral particles, yields a product which, when it reaches crevices in the strata which are yielding water, forms a gelation-out mass of curdy precipitate or solid or semi-solid emulsion of a high viscosity. In any event it represents a rapid gelding agent for the strata crevices and permits pressure to be applied to fracture the strata without loss of fluid through crevices, openings or the like.

The herein described products and the derivatives thereof are particularly valuable in flooding processes for recovery of oil from subterranean oil-bearing strata when employed in the manner described in U.S. Patent No. 2,233,381, dated February 25, 1941, to De Groote and Keiser.

I claim:

A member of the class consisting of monomeric and polymeric solvent soluble esters of polycarboxy acids having up to four carboxyl groups, having up to 50 carbon atoms, and in which the carboxy groups are the sole reactive groups with a polyoxyalkylene glycol mixture of the general statistical formula $$HO-(R)_y-(C_2H_4O)_x-(R')_{y'}-H$$

wherein $x$ is at least five and not over 60, R and R' represent at least one radical selected from the group consisting of $C_3H_6O$ and straight chain $C_4H_8O$, and $y$ plus $y'$ is at least 5 and not over 220.

References Cited in the file of this patent

UNITED STATES PATENTS

| | | |
|---|---|---|
| 2,295,165 | De Groote et al. | Sept. 8, 1942 |
| 2,562,878 | Blair | Aug. 7, 1951 |
| 2,695,914 | De Groote | Nov. 30, 1954 |
| 2,911,434 | Kocher | Nov. 3, 1959 |